(12) United States Patent
Stribling (10) Patent No.: US 10,579,366 B2
(45) Date of Patent: Mar. 3, 2020

(54) DATA UPGRADE FRAMEWORK FOR DISTRIBUTED SYSTEMS

(71) Applicant: Nicira, Inc., Palo Alto, CA (US)

(72) Inventor: Jeremy Stribling, San Francisco, CA (US)

(73) Assignee: NICIRA, INC., Palo Alto, CA (US)

( * ) Notice: Subject to any disclaimer, the term of this patent is extended or adjusted under 35 U.S.C. 154(b) by 511 days.

(21) Appl. No.: 14/028,174

(22) Filed: Sep. 16, 2013

(65) Prior Publication Data
US 2015/0082322 A1 Mar. 19, 2015

(51) Int. Cl.
G06F 8/65 (2018.01)
G06F 8/656 (2018.01)
G06F 9/54 (2006.01)

(52) U.S. Cl.
CPC ............ *G06F 8/656* (2018.02); *G06F 8/65* (2013.01); *G06F 9/541* (2013.01)

(58) Field of Classification Search
CPC ............ G06F 8/65; G06F 9/541; G06F 8/656
See application file for complete search history.

(56) References Cited

U.S. PATENT DOCUMENTS

| | | | | |
|---|---|---|---|---|
| 5,913,061 A * | 6/1999 | Gupta | ............... | G06Q 10/10 718/101 |
| 7,260,818 B1 * | 8/2007 | Iterum | ............... | G06F 8/71 717/102 |
| 7,533,156 B1 * | 5/2009 | Jeyaraman et al. | ......... | 709/218 |
| 2002/0112058 A1 * | 8/2002 | Weisman et al. | ......... | 709/227 |
| 2003/0005169 A1 * | 1/2003 | Perks et al. | ......... | 709/315 |
| 2003/0145315 A1 * | 7/2003 | Aro | ............... | G06F 9/541 717/170 |
| 2003/0149970 A1 * | 8/2003 | Shanbhogue | ......... | G06F 8/656 717/170 |
| 2003/0191803 A1 * | 10/2003 | Chinnici et al. | ......... | 709/203 |
| 2004/0015834 A1 * | 1/2004 | Mestre et al. | ......... | 717/106 |
| 2004/0210673 A1 * | 10/2004 | Cruciani | ............... | H04L 67/1097 709/246 |
| 2004/0216133 A1 * | 10/2004 | Roush | ......... | 719/316 |
| 2004/0255287 A1 * | 12/2004 | Zhang | ............... | G06F 8/656 717/171 |

(Continued)

OTHER PUBLICATIONS

Ajmani, S., Liskov, B., and Shrira, L., "Modular software upgrades for distributed systems," In Proceedings of the European Conference on Object-Oriented Programming (ECOOP) (Jul. 2006).

(Continued)

*Primary Examiner* — Brian W Wathen
(74) *Attorney, Agent, or Firm* — Loza & Loza, LLP (57) ABSTRACT

Techniques for facilitating data upgrades in a distributed system are provided. In one embodiment, a first instance of a distributed application executing on a first node of a distributed system can receive a message from a second instance of the distributed application executing on a second node of the distributed system. The first instance of the distributed application can then determine, via logic included in application code generated by an interface definition language (IDL) compiler, whether the message can be natively understood. If the message cannot be natively understood, the first instance of the distributed application can invoke a translation service for translating the message.

26 Claims, 6 Drawing Sheets

(56) References Cited

U.S. PATENT DOCUMENTS

| | | | | |
|---|---|---|---|---|
| 2007/0226370 | A1* | 9/2007 | Banks | H04L 12/66 709/246 |
| 2008/0295088 | A1* | 11/2008 | Bhat | G06F 8/656 717/170 |
| 2009/0158407 | A1* | 6/2009 | Nicodemus | H04L 63/20 726/6 |
| 2010/0216133 | A1* | 8/2010 | Pancoska | C12Q 1/6855 435/6.1 |
| 2010/0330971 | A1* | 12/2010 | Selitser | H04L 41/5041 455/418 |

OTHER PUBLICATIONS

Amazon elastic compute cloud (Amazon EC2). http://aws.amazon.com/ec2/ (viewed Sep. 11, 2013).
Koponen, T., Casado, M., Gude, N., Stribling, J., Poutievski, L., Zhu, M., Ramanathan, R., Iwata, Y., Inoue, H., Hama, T., and Shenker, S., "Onix: A distributed control platform for large-scale production networks," In Proceedings of the 9th Symposium on Operating Systems Design and Implementation (OSDI) (Oct. 2010).
Protocol Buffers, https://developers.google.com/protocol-buffers/ (viewed Sep. 11, 2013).
RabbitMQ: Messaging that just works, http://www.rabbitmq.com/.
Network virtualization platform | Nicira, http:nicira.com/en/network-virtualization-platform (viewed Sep. 11, 2013).

* cited by examiner

DATA UPGRADE FRAMEWORK FOR DISTRIBUTED SYSTEMS

BACKGROUND

In the field of computer science, a distributed system is a collection of autonomous processing nodes (e.g., physical or virtual computers) that act in concert to achieve a common computing goal or purpose. Each node of a distributed system executes a component of a software application, referred to as a distributed application, which exchanges messages with other components of the distributed application executing on other nodes. Through this message passing process, the nodes can interact with each other and coordinate their actions. Examples of well-known distributed systems include hosted service platforms (e.g., software-as-a-service, infrastructure-as-a-service, etc.), distributed databases, peer-to-peer content delivery networks, and the like.

One aspect of managing a distributed system involves upgrading the system (in other words, updating the distributed application software running on each node of the system) on a periodic basis. In environments where the availability of the distributed system is an important consideration, upgrades are typically performed using a "rolling" approach in which the nodes of the system are brought offline and updated in phases (rather than all at once). This approach ensures that there are always some live (i.e., online) nodes in the distributed system for carrying out application processing.

Because a rolling upgrade is an incremental process, there will generally be a window of time during such an upgrade where some live nodes are running the new (i.e., upgraded) version of the distributed application while other live nodes are concurrently running the old (i.e., non-upgraded) version of the distributed application. Although this version mismatch between nodes may not cause any complications if the upgrade involves minor changes to the application's internal logic, it can be problematic if the upgrade is a "data upgrade," and thus includes changes to any of the message data formats used for inter-node communication. In the latter case, a first node executing the old version of the distributed application may not be able to decipher upgraded messages sent by a second node executing the new version of the distributed application, since the first node has not yet been updated with the appropriate application code for recognizing and parsing those upgraded messages.

To mitigate this issue, it is possible to mark certain data fields of a message as optional, implement code for automatically ignoring unknown data, and provide default values for data fields. These techniques solve some important use cases, such as adding a new data field or deleting an existing data field.

However, other types of data format changes are not as easily addressed by conventional techniques. For example, if the type or format of an existing data field in a message is modified (e.g., as an optimization to reduce overhead), the new version of the distributed application must generally write/transmit the modified message in both the old and new data formats so it can be understood by older application versions. This, in turn, leads to higher overhead and worse performance until the next system upgrade (and thus defeats the purpose of the optimization, if that was the reason for the change). Further, while this type of temporary inefficiency may be tolerable for in-house distributed systems where the application developers can make assumptions about the speed of the upgrade cycle, it is less acceptable for distributed systems that are deployed and maintained externally at customer premises (i.e., "remote" distributed systems). With remote distributed systems, upgrades that introduce such inefficiencies are generally disallowed, since it is difficult to predict when the customer will next be willing to upgrade.

SUMMARY

Techniques for facilitating data upgrades in a distributed system are provided. In one embodiment, a first instance of a distributed application executing on a first node of a distributed system can receive a message from a second instance of the distributed application executing on a second node of the distributed system. The first instance of the distributed application can then determine, via logic included in application code generated by an interface definition language (IDL) compiler, whether the message can be natively understood. If the message cannot be natively understood, the first instance of the distributed application can invoke a translation service for translating the message.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes a framework (referred to herein as a "data upgrade framework") for gracefully handling cross-version communication between nodes of a distributed system when, e.g., a data upgrade is applied in a rolling manner to the system. In one embodiment, the data upgrade framework can include upgrade management logic that is incorporated within IDL-generated code of the system's distributed application software. The data upgrade framework can further include a translation service that is installed on each node of the distributed system. The translation service can be "independently-upgradeable," which means that the translation service can be upgraded separately from the distributed application on each node, and thus can be made aware of any new/modified message data formats included in a new application version before the application itself is upgraded on the node.

When a first node (i.e., a "receiver" node) receives a message originating from a second node (i.e., a "transmitter" node), the upgrade management logic included in the application instance running on the receiver node can intercept the message and determine whether the message can be natively understood by the application instance. If the message cannot be natively understood (indicating a version mismatch between the receiver and transmitter nodes), the upgrade management logic can pass the message to the receiver node's translation service. The translation service can then translate the message into a data format appropriate for the receiver node's application instance and pass the translated message back to the application instance. In this manner, the receiver node can be enabled to understand the message, even if the message was originally created by the transmitter node using a different (e.g., upgraded) version of the distributed application.

2. Exemplary Distributed System

Figure 1:
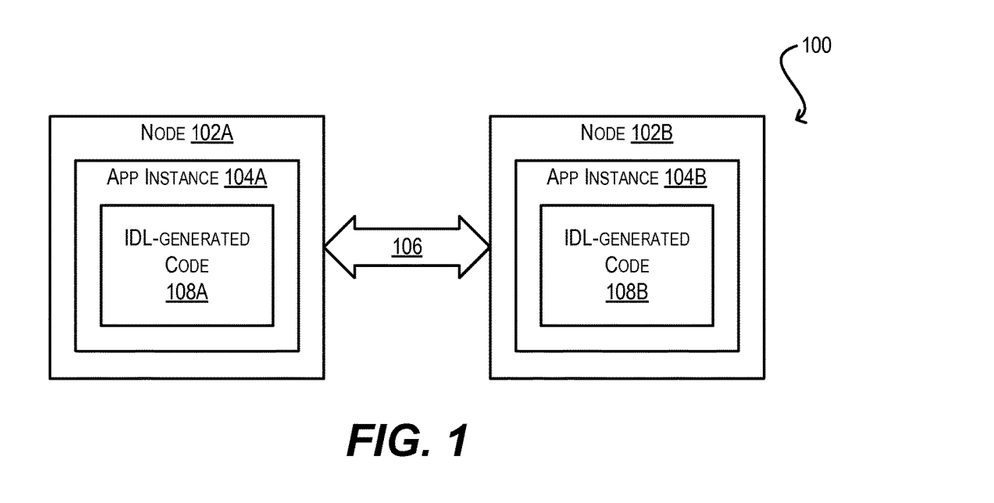
FIG. 1 depicts a block diagram of an exemplary distributed system.

To provide context for the embodiments described herein, FIG. 1 depicts an exemplary distributed system 100 that comprises nodes 102A and 102B, each executing an instance of a distributed application (104A/104B). Although only two nodes are shown for purposes of illustration, it should be appreciated that any number of such nodes may be supported. Application instances 104A and 104B communicate with each other by exchanging messages over a communication channel 106, where a "message" refers to any type of data record that is structured according to a predetermined format.

2.1 IDL-generated Code

In the example of FIG. 1, application instances 104A and 104B each include IDL-generated code (108A/108B). As known in computer programming, an IDL is a specification language that is used to define interfaces between software components in a portable (i.e., programming language-independent) way. Examples of common IDLs include Protocol Buffers ("protobufs") and WSDL. In the case of distributed applications, IDLs are often used to specify portable message types (in the form of "IDL definitions"), which are compiled into native code for the distributed application's programming language via an IDL compiler. This native, IDL compiler-generated code corresponds to the content of code 108A and 108B shown in FIG. 1.

By way of example, assume that application instances 104A and 104B exchange "User" messages that are specified according to the following protobufs IDL definition (although protobufs is used in this example, any other IDL may also be used):

Listing 1

```
message User {
    optional string level = 1 [default = "normal"];
    required string name = 2;
    optional int32 ssn = 3;
};
```

Further assume that the native programming language for application instances 104A and 104C is the C programming language. In this scenario, IDL-generated code 108A and 108B can include the following C representation of the User message definition (as generated by a protobufs-to-C compiler):

Listing 2

```
struct User {
    char *level;
    char *name;
    int ssn;
};
```

With the native C representation shown in Listing 2, application instances 104A and 104B can process and manipulate User messages as needed, even though the User message type was originally defined declaratively using the protobufs IDL.

In addition to native message representations, IDL-generated code 108A and 108B can also include serialization and deserialization code for facilitating transmission of messages between nodes. For instance, with respect to the C struct shown in Listing 2, IDL-generated code 108A and 108B can include a serialization method/function for converting the C struct into a wire format (e.g., a bit stream) that is appropriate for writing the data to a file or a network socket. IDL-generated code 108A and 108B can also include a deserialization method/function for receiving the bit stream generated by the serialization method/function and converting the bit stream from the wire format back into the C struct representation of Listing 2. In this way, IDL-generated code 108A and 108B can abstract away the wire-level details of inter-node communication from other, higher levels of the distributed application.

2.2 Rolling Data Upgrades

As noted the Background section, one of the difficulties of managing a distributed system such as system 100 involves applying data upgrades to the system in a rolling fashion (referred to as "rolling data upgrades"). During such an upgrade, there will typically be a period of time in which some live nodes are executing the new (i.e., upgraded) version of the distributed application while other live nodes are executing the old (i.e., non-upgraded) version of the distributed application. This version mismatch between nodes can, depending on the nature of the message format changes, prevent the system from functioning as intended.

For example, consider a situation where application instance 104A of node 102A is upgraded before application instance 104B of node 102B, and where the upgrade entails a type change to the "level" data field of the User message type shown in Listing 1 as follows:

Listing 3

```
enum UserLevel {
    NORMAL = 0,
    ADMIN = 1,
    GUEST = 2
};
message User {
    optional UserLevel level = 1 [default=NORMAL];
    required string name = 2;
    optional int32 ssn = 3;
};
```

In this situation, application instance 104B of node 102B (which corresponds to the old version of the application) has no knowledge of the modified level type shown in Listing 3, and will assume that the level data field in all incoming User messages is a string (per the original definition in Listing 1). Thus, when application instance 104B receives an upgraded User message from upgraded application instance 104A, application instance 104B will attempt to interpret the message according to the old definition and will likely generate an error (or otherwise cause incorrect/unexpected application behavior).

One way to work around this problem is to maintain the original level data field (having the original string type) in the upgraded User message definition, while adding a new level data field (i.e., "new_level") having the new enumeration type:

---
Listing 4
---
```
message User {
    optional string level = 1 [default = "normal"];
    required string name = 2;
    optional int32 ssn = 3;
    optional UserLevel new_level = 4 [default=NORMAL];
};
```
---

With this workaround, upgraded application instance 104A of node 102A can fill in both the level and new_level data fields when sending out upgraded User messages, so that application instance 104B of node 102B can still understand the message content. However, this approach has the negative consequence of increasing the size of each User message, which can be counterproductive if the original purpose of the type change was to reduce message overhead. Further, in the case of remote distributed systems, workarounds that introduce such inefficiencies are generally frowned upon, since the inefficiency may persist in the customer's environment for an unknown period of time (e.g., until the customer is willing to upgrade again).

Certain other kinds of message format changes (such as changing the format of a data field or changing a first message type into a second, different message type) are fraught with similar problems as those discussed above with respect to field type changes.

3. Data Upgrade Framework

To address the foregoing issues, embodiments of the present disclosure provide a novel data upgrade framework. At a high level, the data upgrade framework can enable each node of a distributed system to automatically translate incoming messages if the messages are unknown to the version of the application running on that node, thereby mitigating or eliminating cross-version message incompatibilities (as may occur during a rolling data upgrade).

3.1 Runtime Components

Figure 2:
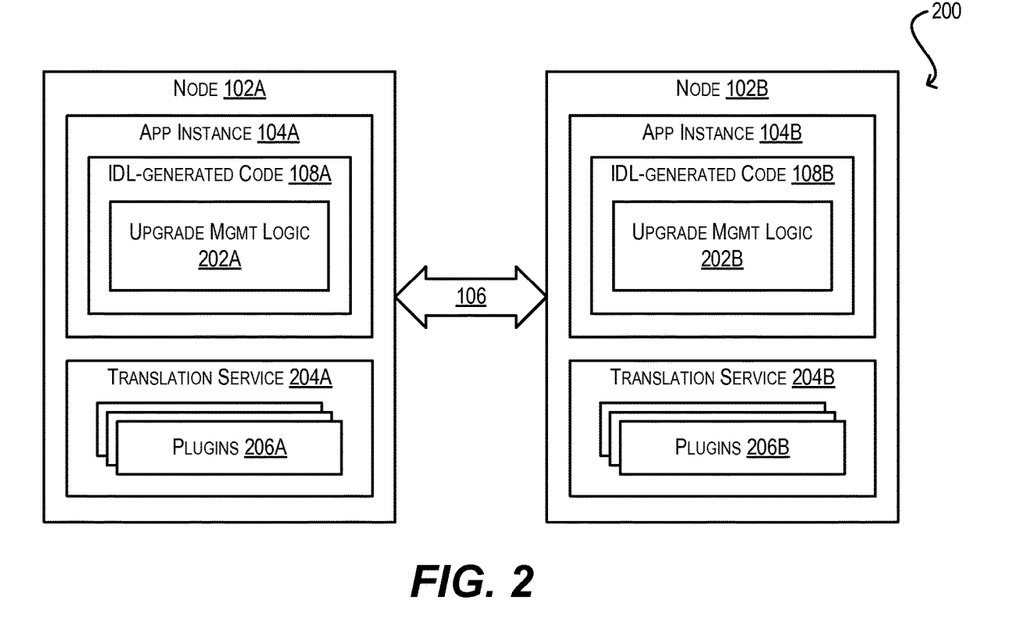
FIG. 2 depicts a block diagram of a distributed system that has been enhanced to support a data upgrade framework according to an embodiment.

FIG. 2 depicts a distributed system 200 that implements certain runtime components of the data upgrade framework according to an embodiment. As shown in FIG. 2, distributed system 200 is similar to distributed system 100 of FIG. 1, but has been modified to include, at each node 102A/102B, upgrade management logic 202A/202B within the node's IDL-generated code 108A/108B. In a particular embodiment, upgrade management logic 202A/202B can be incorporated within the IDL-generated code's deserialization method/function.

In addition, each node 102A/102B has been modified to include a translation service 204A/204B that is separate from application instance 104A/104B. For example, translation services 204A and 204B can be implemented as standalone applications or processes. Each translation service 204A/204B comprises a set of plugins 206A/206B, which correspond to functions for translating between specific versions of messages (or between specific message types).

When a rolling data upgrade is scheduled to be applied to distributed system 200 (e.g., an upgrade from application version $v_1$ to $v_2$), an administrator of system 200 can first update translation services 204A and 204B as part of a "pre-upgrade" phase. This pre-upgrade phase can ensure that the translation service on each node has access to the appropriate plugin(s) for translating message formats/versions between application versions $v_1$ and $v_2$.

Once the pre-upgrade phase is complete, each node 102A/102B can carry out, via its upgrade management logic 202A/202B and translation service 204A/204B, a process for performing receiver-side translation of incoming messages. In particular, when a given node (i.e., the receiver node) receives a message originating from another node (i.e., the transmitter node), the receiver node's upgrade management logic can intercept the message and determine whether the message can be natively understood by the current version of the receiver node's application instance. If the message can be natively understood, the application instance can process the message per its standard code path, without requiring any translation.

On the other hand, if the message cannot be natively understood (indicating that the application instance on the transmitter node has been upgraded to version $v_2$ before the application instance on the receiver node), the receiver node's upgrade management logic can forward the message to the receiver node's translation service. As noted above, due to the pre-upgrade phase, the translation service already has access to the requisite plugin(s) for converting messages between application versions $v_1$ and $v_2$. Accordingly, upon being forwarded the message, the translation service can select an appropriate plugin for translating the message into the type/version expected by the receiver node's application instance and invoke the selected plugin to carry out the translation. The translation service can then provide the translated message back to the application instance, which can continue with its processing as if there was no version discrepancy.

It should be noted that the receiver node may receive the message from the transmitter node in either a direct or indirect manner. In the former case, the transmitter node may provide the message to the receiver node via, e.g., a remote procedure call. In the latter case, the transmitter node may write the message to a shared storage medium (e.g., a networked storage system), which the receiver node reads at a later point in the time. In this indirect scenario, the transmitter node will not know ahead of time which other nodes will subsequently read the message, and thus cannot negotiate a common message format with those nodes prior to message transmission/writing.

3.2 Message Structure

In order for upgrade management logic 202A/202B to determine whether a particular incoming message can be natively understood by its corresponding application instance 104A/104B, each message in distributed system 200 can be configured to include two pieces of information: a message type identifier and a message version number. The message type identifier can identify the type, or kind, of the message, while the message version number can identify the current version of the message. These pieces of information can be placed at a known, fixed location within every message, so that they can be read by any version of the distributed application. For example, with respect to the "User" message type described above, the protobufs definition for this message type (as shown in Listing 1) can be modified to include a message type identifier (e.g., "message_type") and a message version number (e.g., "message_version") as follows:

---
Listing 5
---

```
message User {
    optional string level = 1 [default = "normal"];
    required string name = 2;
    optional int32 ssn = 3;
    optional uint32 message_type = 1000 [default = 42];
    optional uint32 message_version = 1001 [default = 1];
};
```

In the example of Listing 5, the message_type and message_version fields are specified using reserved field numbers 1000 and 1001; this ensures that the values for these fields will appear in the same place for every message, regardless of the message_version. In alternative embodiments, a fixed offset in a binary format would also work. In addition, in Listing 5, the values for the message_type and message_version fields are specified via the "default" annotation, since this is a convenient way to include user-defined values in a protobufs definition. In embodiments where other IDLs are used, these values can be specified via other mechanisms.

With the message structure described above, when upgrade management logic 202A/202B intercepts a message, it can extract the message_type identifier and message_version number from the message and compare these values against an expected message_type identifier and an expected message_version number associated with its corresponding application instance 104A/104B. If the message_type identifier and the message_version number match the expected message_type identifier and the expected message_version number respectively, upgrade management logic 202A/202B can conclude that the message can be natively understood by application instance 104A/104B. Otherwise, upgrade management logic 202A/202B can conclude that the message is unknown and should be sent to translation service 204A/204B for translation.

Generally speaking, the foregoing processing assumes that the developers maintaining the message definitions will remember to increment the message_version number for a given message when changing the message in an incompatible way (e.g., changing a field type, changing a field format, etc.). Section 3.7 below describes certain tools that can be implemented for enforcing this practice in an automated manner.

3.3 Exemplary Message Flows

Figure 3:
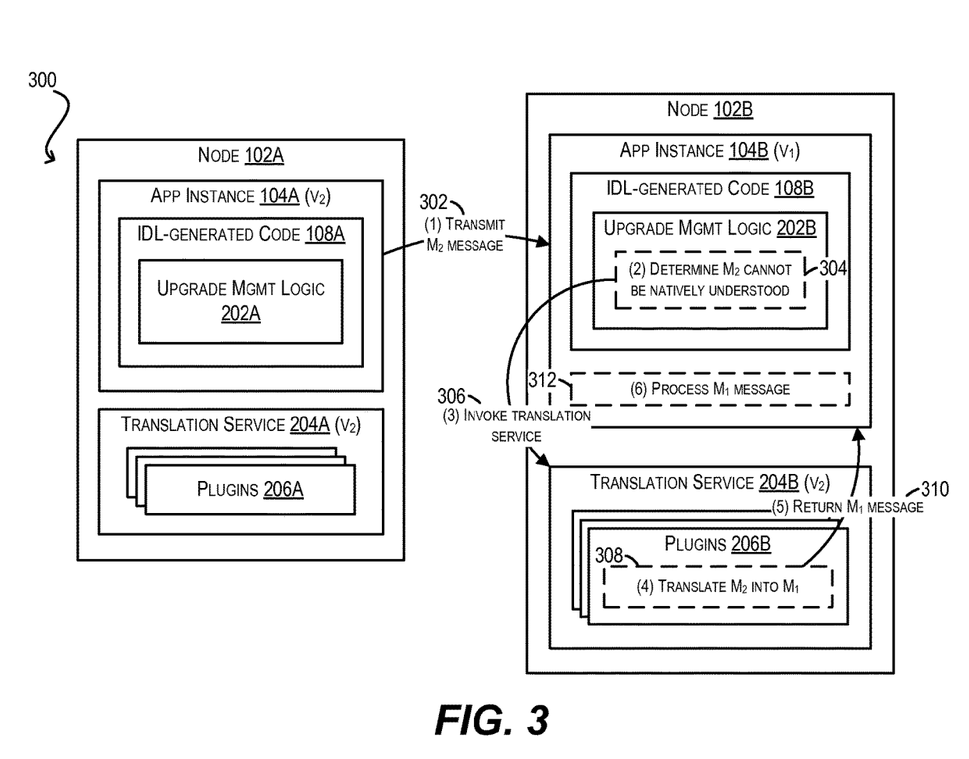
FIG. 3 depicts a first message flow in the enhanced distributed system of FIG. 2 according to an embodiment.
Figure 4:
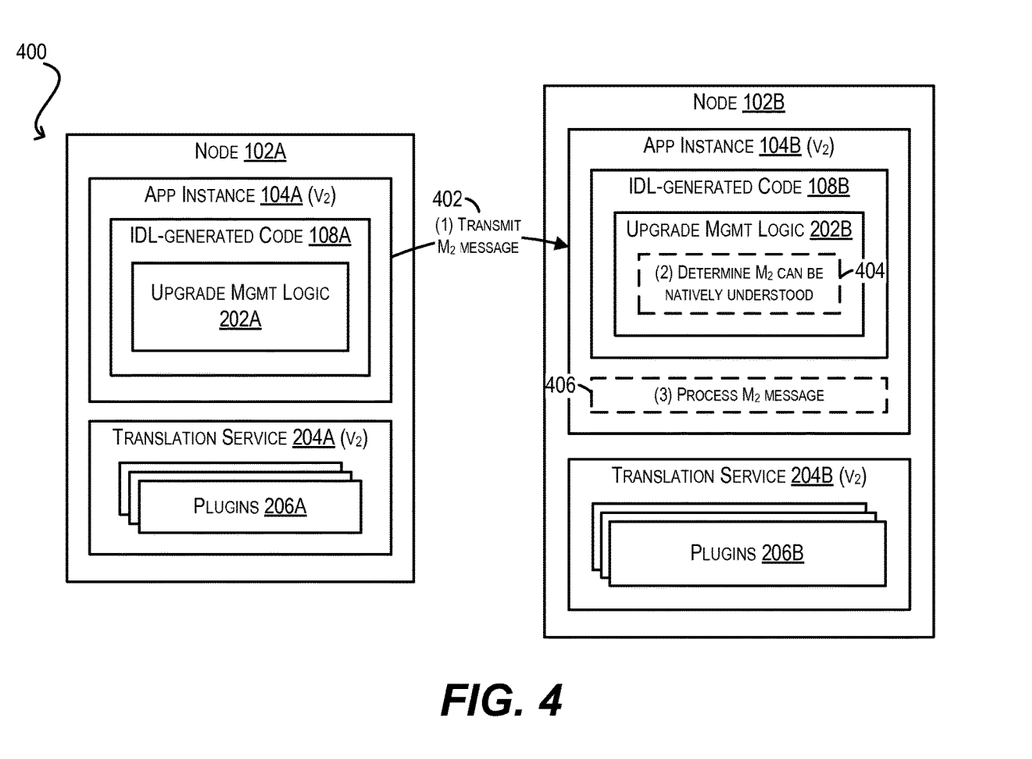
FIG. 4 depicts a second message flow in the enhanced distributed system of FIG. 2 according to an embodiment.

To better illustrate the runtime operation of upgrade management logic 202A/202B and translation services 204A/204B, FIGS. 3 and 4 depict exemplary message flows 300 and 400 that may occur between nodes 102A and 102B of system 200 according to an embodiment. In particular, flow 300 depicts a scenario where a message transmitted from node 102A to 102B requires translation, and flow 400 depicts a scenario where a message transmitted from node 102A to node 102B does not require any translation.

Starting with FIG. 3, the scenario of flow 300 assumes that application instance 104A of node 102A has been upgraded to a version $v_2$ of the distributed application while application instance 104B of node 102B remains on an older application version $v_1$, where application version $v_2$ includes a new version 2 of a message type M. This new message type version is referred to as $M_2$, in contrast to old message type version $M_1$ (i.e., version 1 of message type M) defined in application version $v_1$. The scenario of flow 300 further assumes that translation services 204A and 204B have been upgraded to support application version $v_2$, and thus understand new message type version $M_2$.

At step (1) (reference numeral 302) of flow 300, application instance 104A of node 102A can transmit a message corresponding to message type version $M_2$ (i.e., an "$M_2$ message") to application instance 104B of node 102B. In accordance with the message structure described in section 3.2, the message can include a message type identifier "M" and a message version number "2".

At step (2) (reference numeral 304), upgrade management logic 202B of node 102B can intercept the $M_2$ message and determine that the message cannot be natively understood by application instance 104B. For example, upgrade management logic 202B can perform this determination by extracting the message type identifier and the message version number from the message and establishing that these extracted values (i.e., M and 2) do not match the message type identifier and message version number expected by application instance 202B (i.e., M and 1), since application instance 202B is still on older application version $v_1$. As noted previously, in certain embodiments upgrade management logic 202B can be incorporated into a deserialization method/function of IDL-generated code 108B. Thus, in these embodiments, step (2) can be performed as part of the process of deserializing the $M_2$ message (described in further detail with respect to FIG. 7 below).

Upon determining that the $M_2$ message is an unknown message, upgrade management logic 202B can invoke translation service 204B (step (3), reference numeral 306). In response, translation service 204B can select an appropriate plugin from the set of plugins 206B for translating the message into the message type version understood by application instance 104B (i.e., $M_1$). Finally, translation service 204B can execute the translation using the selected plugin (step (4), reference numeral 308), and return the translated $M_1$ message to application instance 104B for further processing (steps (5) and (6), reference numerals 310 and 312).

Turning now to FIG. 4, the scenario of flow 400 assumes that application instances 104A and 104B of nodes 102A and 102B respectively have each been upgraded to application version $v_2$. Accordingly, both application instances can understand new message type version $M_2$.

At step (1) (reference numeral 402) of flow 400, application instance 104A can transmit an $M_2$ message to application instance 104B. As noted previously, the message can include a message type identifier "M" and a message version number "2".

At step (2) (reference numeral 404), upgrade management logic 202B can intercept the $M_2$ message and determine that the message can be natively understood by application instance 104B, since application instances 104A and 104B correspond to the same application version and thus the message type identifier and the message version number (i.e., M and 2) in the message match what is expected by application instance 104B. As a result, application instance 104B can directly process the message, without incurring the costs associated with invoking translation service 204B (step (3), reference numeral 406).

3.4 Benefits

In comparison to prior art approaches for facilitating cross-version communication between nodes of distributed system, the data upgrade framework of the present disclosure provides a number of unique benefits/advantages. For example, as discussed in the Background section, certain techniques exist for handling the use cases of new or deleted message data fields (e.g., marking fields as optional, automatically ignoring unknown data, providing default values). However, these techniques cannot address more general message format changes, such as changes to the type/format of an existing data field or complete message type conversions. In contrast, the data upgrade framework can gracefully handle these changes (as well as any kind of message format change where there exists a stateless, deterministic translation from the old version to the new version), without requiring inefficient workarounds.

Further, certain techniques exist for implementing a translation proxy layer that sits above (or in front of) the distributed application software on each node of a distributed system. With these techniques, the translation proxy layer performs the tasks of intercepting incoming messages and performing message translations if needed. However, implementing such a separate layer is difficult in the general case; implementation details such as inter-node communication security, de-multiplexing messages destined for different application ports, and context needed for translation that may only exist with the application itself can make it challenging, if not impossible, to simply insert a layer in front of the application. By implementing upgrade management logic 202A/202B directly within the distributed application, the data upgrade framework can overcome these challenges. In addition, by leveraging the IDL-generated code that is typically used in existing distributed applications, the framework can be integrated into legacy systems/applications with relatively little effort.

3.5 Setup Processes

Figure 5:
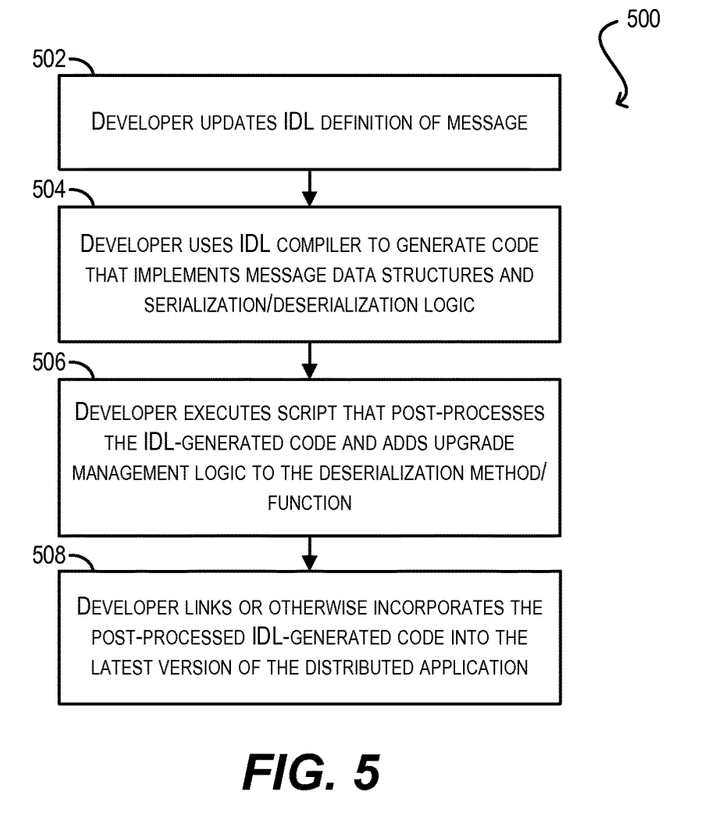
FIGS. 5 and 6 depict setup processes for the enhanced distributed system of FIG. 2 according to an embodiment.

In various embodiments, the runtime operation of the data upgrade framework (as described with respect to FIGS. 2-4) is dependent on the proper configuration/setup of application instances 104A/104B and translation services 204A/204B prior to the start of an upgrade. FIG. 5 depicts a flowchart 500 that can be performed by an application developer at the time of implementing a message format change so that the message can be translated by receiver nodes at runtime. Flowchart 500 assumes that the distributed application makes use of an IDL for message definition and message serialization/deserialization.

At block 502, the developer can modify the format of an existing message by updating the message's IDL definition. For example, the developer may change the type or format of an existing data field, or may create an entirely new message type to replace an existing message data type. As part of block 502, the developer can update the message type identifier and/or the message version number in the IDL definition to reflect the modification.

At block 504, the developer can use an appropriate IDL compiler to generate application code (e.g., IDL-generated code 108A/108B) that implements the data structure(s) for the message and its serialization/deserialization methods/functions in the native language of the distributed application.

Once the application code has been generated by the IDL compiler, the developer (or another individual/agent involved in the development process) can execute a program (e.g., a script) that post-processes the IDL-generated code and thereby adds upgrade management logic 202A/202B to, e.g., the deserialization method/function of the code (block 506). With this step, the IDL-generated code can be configured to execute the upgrade management logic each time it receives and attempts to deserialize an incoming message.

In alternative embodiments, the IDL compiler itself can be configured to add the upgrade management logic to the deserialization method/function as part of the code generation process of block 504. This avoids the need to perform the separate, post-processing step of block 506.

Finally at block 508, the developer can link or otherwise incorporate the modified IDL-generated code into the latest version of the application, which will ultimately be applied to each node of the distributed system via an upgrade process.

Figure 6:
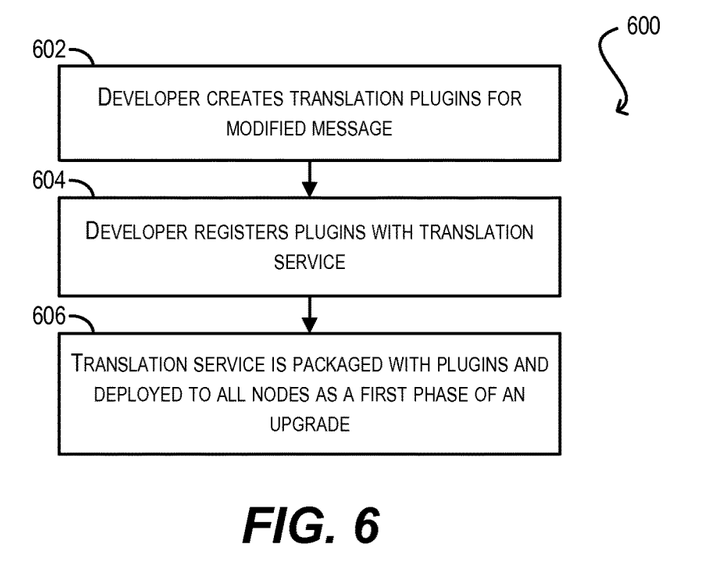

FIG. 6 depicts a flowchart 600 that can be performed by the same (or different) application developer as FIG. 5 for configuring translation service 204A/204B to recognize and support translation of the message format change implemented in flowchart 500. At block 602, the developer can create two new translation plugins (e.g., functions): one plugin for converting the old version of the message into the new version of the message, and another plugin for converting the new version of the message into the old version of the message. In a particular embodiment, each plugin can take, as input, a deserialized message of the output type and an empty instantiation of the output type (which is used to return the completed output message). For example, the following is an exemplary plugin for converting the version of the User message type shown in Listing 1 ("v1") into the version shown in Listing 3 ("v2"):

Listing 6

```
def user_v1_to_v2 (in_msg, out_msg):
    out_msg.name = in_msg.name
    out_msg.ssn = in_msg.ssn
    if in_msg.level == "normal":
        out_msg.level = NORMAL
    elif in_msg.level == "admin":
        out_msg.level = ADMIN
    elif in_msg.level == "guest":
        out_msg.level = GUEST
    return out_msg
```

At block 604, the developer can register the created plugins with the translation service, which enables the translation service to know that it should invoke these plugins upon receiving an instance of the message type that requires translation from the old version to the new version or vice versa. In one embodiment, this registration process can comprise updating a configuration file used by the translation service.

Once the plugins have been registered, they can be packaged with the translation service and deployed to each node of a distributed system as part of a first phase (i.e., the "pre-upgrade" phase) of a rolling upgrade, at block 606. In this way, the translation service on each node can be made aware of the modified message format before the distributed application itself is upgraded on the node.

3.6 Receiver-side Translation Flow

Figure 7:
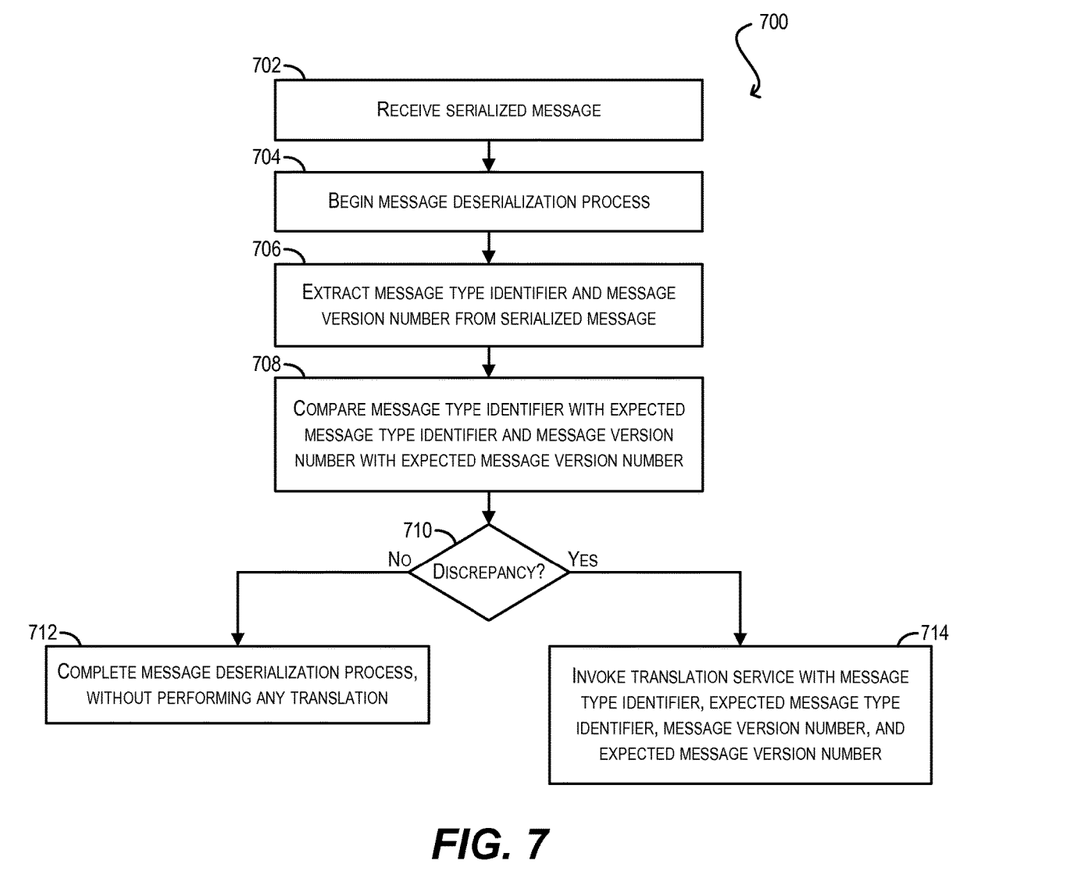
FIGS. 7 and 8 depict flowcharts for translating an incoming message at a receiver node according to an embodiment.
Figure 8:
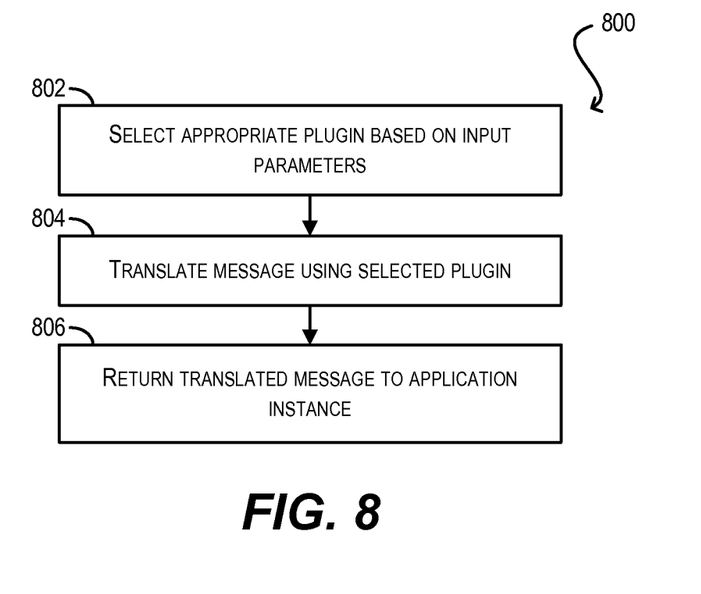

FIGS. 7 and 8 depict flowcharts 700 and 800 that provide additional details regarding the processing attributed to application instances 104A/104B and translation services 204A/204B in FIGS. 3 and 4 for performing receiver-side translation according to an embodiment. Flowcharts 700 and 800 assume that the application instances and the translation services have been configured/setup according to the flowcharts of FIGS. 5 and 6.

At block 702 of flowchart 700, application instance 104A/104B of a receiver node can receive a message from another node (i.e., a transmitter node) of system 200. In this embodiment, the message is received in serialized form (e.g., a bit stream), and thus is routed to the deserialization method/function of the application instance's IDL-generated code 108A/108B.

At blocks 704 and 706, the message deserialization process can be initiated and upgrade management logic 202A/202B included in the deserialization method/function can extract the message type identifier and the message version number from the message. Upgrade management logic 202A/202B can then compare the extracted message type identifier and message version number with an expected message type identifier and an expected message version number associated with the version of the application running on the receiver node (block 708). If there is no discrepancy between the extracted and expected values, the message deserialization process can be completed and the message can be processed, without performing any translation (blocks 710 and 712).

If there is a discrepancy, upgrade management logic 202A/202B can conclude that the message is unknown. In response, upgrade management logic 202A/202B can invoke translation service 204A/204B of the receiver node in order to translate the message into an understandable format (block 714). As part of this invocation, upgrade management logic 202A/202B can pass the extracted message type identifier, the expected message type identifier, the extracted message version number, and the expected message version number to translation service 204A/204B.

Moving on to FIG. 8, at block 802, translation service 204A/204B can select an appropriate plugin for translating the message from its plugin set 206A/206B based on the input parameters received at block 714. For instance, translation service 204A/204B can compare the input parameters with corresponding parameters for each registered plugin.

At block 804, translation service 204A/204B can invoke the selected plugin in order to translate the message into the message type/version expected by the receiver node's application instance. Finally, at block 806, translation service 204A/204B can return the translated message to the application instance for, e.g., further processing.

3.7 Other Features

Beyond the components and functionality described in sections 3.1-3.6 above, in certain embodiments the data upgrade framework can include additional features that facilitate its use/implementation or optimize its operation. For instance, one of the challenges of implementing the framework involves ensuring that (1) each message includes a message type identifier/message version number, and (2) each application developer remembers to update these fields and create corresponding translation plugins when a message format change is made.

To address (1), the data upgrade framework can include functionality that modifies the serialization method/function within an application's IDL-generated code to check for a message type identifier and a message version number in each message, before the message serialized and sent out over the wire. If either of these fields is missing, the application can print a warning message or throw an error, which may be easily caught in testing environments. In a particular embodiment, this field-checking code can be incorporated into the serialization method/function as part of the post processing described with respect to block 506 of FIG. 5.

To address (2), the data upgrade framework can include a design-time tool that can analyze all of the message definitions and plugins for two or more application versions in order to identify incorrect version numbers or missing plugins. For example, if the tool detects that an incompatible change has been made to a given message in a newer application version without a corresponding change to the message's version number, the tool can flag the message definition for correction. In addition, if the tool detects that plugins have not been created for a particular message format change, the tool can identify the omission so that those plugins can be created.

The data upgrade framework can also include optimizations that reduce the overhead associated with including message type/version information in each message. For instance, in one embodiment, the framework can use variable-length encoding to encode these fields (such that smaller integers use fewer bytes on the wire), and can enforce the usage of small integers whenever possible.

In another embodiment, the data upgrade framework can implement a scheme for only including message type/version information in "top-level" messages (in other words, messages that are serialized by the application directly to the wire). Messages that are nested within top-level messages (which potentially compose large lists within the top-level messages) do not need their own type/version fields, which can significantly reduce the number of bytes per message. It should be noted that, with this scheme, any format changes to a nested message will generally require the developer to create plugins for all top-level messages that include the nested message.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Many variations, modifications, additions, and improvements to the embodiments described herein are possible. For example, plural instances can be provided for components, operations, or structures described herein as a single instance. Further, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for facilitating data upgrades in a distributed system, the method comprising:
   before updating a first instance of a distributed application executing on a first node of the distributed system from an older version to a new version, deploying a translation service, which is packaged with a first plugin for translating message formats from the new version to the older version and a second plugin for translating message formats from the older version to the new version, on the first node, wherein the translation service is separate from the first instance of the distributed application;
   receiving, by the first instance of the distributed application executing on the first node of the distributed system, a message from a second instance of the distributed application executing on a second node of the distributed system;
   determining, by the first instance, whether the message can be natively understood, the determining being performed via logic that is included in interface description language (IDL)-generated code of the distributed application; and
   if the message cannot be natively understood, invoking, by the first instance, the translation service deployed on the first node to use the first plugin for translating the message from the new version to the older version or to use the second plugin for translating the message from the older version to the new version.

2. The method of claim 1 wherein the message is received in serialized form, and wherein the logic is included in a deserialization function of the IDL-generated code.

3. The method of claim 1 wherein the logic is created via a program that post processes the IDL-generated code.

4. The method of claim 1 wherein the logic is created as part of a process of generating the IDL-generated code.

5. The method of claim 1 wherein determining whether the message can be natively understood comprises:
   determining a message type identifier and a message version number included in the message; and
   comparing the message type identifier and the message version number with an expected message type identifier and an expected message version number associated with the first instance.

6. The method of claim 5 wherein the message is a top-level message that includes one or more nested messages, and wherein the message type identifier and the message version number are associated solely with the top-level message.

7. The method of claim 5 wherein the second instance of the distributed application is configured to verify that the message includes the message type identifier and the message version number prior to transmitting the message.

8. The method of claim 1 wherein, if the message can be natively understood, the message is processed by the first instance without translation.

9. The method of claim 1 further comprising, subsequently to the invoking:
   selecting, by the translation service, a plugin from a plurality of plugins registered with the translation service, the selected plugin being suitable for translating the message; and
   invoking, by the translation service, the selected plugin.

10. A non-transitory computer readable storage medium having stored thereon computer software corresponding to a distributed application, the computer software embodying a method that, when executed on a first node of a distributed system, comprises:
    before updating the computer software executing on the first node of the distributed system from an older version to a new version, deploying a translation service, which is packaged with a first plugin for translating message formats from the new version to the older version and a second plugin for translating message formats from the older version to the new version, on the first node, wherein the translation service is separate from the computer software;
    receiving a message from an instance of the distributed application executing on a second node of the distributed system;
    determining, via logic included in interface description language (IDL)-generated code, whether the message can be natively understood; and
    if the message version number cannot be natively understood, invoking the translation service deployed on the first node to use the first plugin for translating the message from the new version to the older version or to use the second plugin for translating the message from the older version to the new version.

11. The non-transitory computer readable storage medium of claim 10 wherein the message is received in serialized form, and wherein the logic is included in a deserialization function of the IDL-generated code.

12. The non-transitory computer readable storage medium of claim 10 wherein the logic is created via a program that post processes the IDL-generated code.

13. The non-transitory computer readable storage medium of claim 10 wherein the logic is created as part of a process of generating the IDL-generated code.

14. The non-transitory computer readable storage medium of claim 10 wherein determining whether the message can be natively understood comprises:
   determining a message type identifier and a message version number included in the message; and
   comparing the message type identifier and the message version number with an expected message type identifier and an expected message version number.

15. The non-transitory computer readable storage medium of claim 14 wherein the message is a top-level message that includes one or more nested messages, and wherein the message type identifier and the message version number are associated solely with the top-level message.

16. The non-transitory computer readable storage medium of claim 14 wherein the instance of the distributed application executing on the second node is configured to verify that the message includes the message type identifier and the message version number prior to transmitting the message.

17. The non-transitory computer readable storage medium of claim 10 wherein, if the message can be natively understood, the message is processed without translation.

18. The non-transitory computer readable storage medium of claim 10 wherein, subsequently to the invoking, the translation service:
   selects a plugin from a plurality of plugins registered with the translation service, the selected plugin being suitable for translating the message; and
   invokes the selected plugin.

19. A computer system comprising:
   a processor; and
   a non-transitory computer readable medium having stored thereon computer software corresponding to a distributed application, the computer software causing the processor to, upon being executed:
      before updating the computer software from an older version to a new version, deploying a translation service, which is packaged with a first plugin for translating message formats from the new version to the older version and a second plugin for translating message formats from the older version to the new version, on the computer system, wherein the translation service is separate from the computer software;
      receive a message from an instance of the distributed application executing on another computer system;
      determine, via logic included in interface description language (IDL)-generated code, whether the message can be natively understood; and
      if the message cannot be natively understood, invoke the translation service deployed on the first node to use the first plugin for translating the message from the new version to the older version or to use the second plugin for translating message formats the message from the older version to the new version.

20. The computer system of claim 19 wherein the message is received in serialized form, and wherein the logic is included in a deserialization function of the IDL-generated code.

21. The computer system of claim 19 wherein the logic is created via a program that post processes the IDL-generated code.

22. The computer system of claim 19 wherein the logic is created as part of a process of generating the IDL-generated code.

23. The computer system of claim 19 wherein determining whether the message can be natively understood comprises:
   determining a message type identifier and a message version number included in the message; and
   comparing the message type identifier and the message version number with an expected message type identifier and an expected message version number.

24. The computer system of claim 23 wherein the message is a top-level message that includes one or more nested messages, and wherein the message type identifier and the message version number are associated solely with the top-level message.

25. The computer system of claim 23 wherein the instance of the distributed application executing on said another computer system is configured to verify that the message includes the message type identifier and the message version number prior to transmitting the message.

26. A method for facilitating data upgrades in a distributed system, the method comprising:
   before updating a first instance of a distributed application executing on a first node of the distributed system from an older version to a new version, deploying a translation service, which is packaged with a first plugin for translating message formats from the new version to the older version and a second plugin for translating message formats from the older version to the new version, on the first node, wherein the translation service is separate from the first instance of the distributed application;
   receiving, by the first instance of the distributed application executing on the first node of the distributed system, a message from a second instance of the distributed application executing on a second node of the distributed system;
   determining, by the first instance, whether the message can be natively understood, the determining being performed via logic that is included in interface description language (IDL)-generated code of the distributed application;
   if the message cannot be natively understood, invoking, by the first instance, the translation service deployed on the first node to use the first plugin for translating the message from the new version to the older version or to use the second plugin for translating the message from the older version to the new version,
   wherein determining whether the message can be natively understood comprises:
   determining a message type identifier and a message version number included in the message; and
   comparing the message type identifier and the message version number with an expected message type identifier and an expected message version number associated with the first instance, wherein the message is a top-level message that includes one or more nested messages, wherein the message type identifier and the message version number are associated solely with the top-level message and wherein the second instance of the distributed application is configured to verify that the message includes the message type identifier and the message version number prior to transmitting the message.

* * * * *